(12) United States Patent
Rovner (10) Patent No.: US 7,865,392 B2
(45) Date of Patent: Jan. 4, 2011

(54) BEN-SUMING BUSINESS SYSTEM (75) Inventor: Slava Steve Rovner, 5415 N. Sheridan Rd. apt. 5003, Chicago, IL (US) 60640

(73) Assignee: Slava Steve Rovner, Chicago, IL (US)

( * ) Notice: Subject to any disclaimer, the term of this patent is extended or adjusted under 35 U.S.C. 154(b) by 1842 days.

(21) Appl. No.: 10/891,306

(22) Filed: Jul. 14, 2004

(65) Prior Publication Data

US 2005/0049918 A1  Mar. 3, 2005

Related U.S. Application Data (60) Provisional application No. 60/497,637, filed on Aug. 25, 2003.

(51) Int. Cl.
*G06Q 30/00* (2006.01)

(52) U.S. Cl. ...................................................... 705/14.1

(58) Field of Classification Search .................. 705/14, 705/14.1
See application file for complete search history.

(56) References Cited

U.S. PATENT DOCUMENTS

| 6,415,265 | B1 * | 7/2002 | Shell et al. ..................... 705/26 |
| 6,594,640 | B1 * | 7/2003 | Postrel ..................... 705/14.27 |
| 2002/0073015 | A1 * | 6/2002 | Chan et al. ..................... 705/37 |
| 2002/0198779 | A1 * | 12/2002 | Rowen et al. ................. 705/14 |
| 2004/0006507 | A1 * | 1/2004 | Laufer ......................... 705/10 |

* cited by examiner

*Primary Examiner*—Daniel Lastra (57) ABSTRACT

A method of operating a ben-suming timeshare organization, which is (compared to a traditional timeshare environment) by offering business property (condominium) ownership opportunity, getting a priceless access (i) to a huge market of potential consumers of their products, and (ii) to a valuable source of business development financing.

1 Claim, 4 Drawing Sheets

BEN-SUMING BUSINESS SYSTEM

CROSS-REFERENCE TO RELATED APPLICATIONS

This application claims the benefit of Provisional Patent Application Ser. No. 60/497,637, filed 2003 Aug. 25, by present applicant.

FEDERALLY SPONSORED RESEARCH

Not Applicable

SEQUENCE LISTING OR PROGRAM

Not Applicable

BACKGROUND OF THE INVENTION

1. Field of Invention

The present invention relates to network marketing systems and, more specifically, to an innovative method of conducting a timeshare business.

2. Prior Art

Our planet Earth is beautiful! That is why there will not be a person that would not dream to travel the world and discover its beauty.

The development of modern science and technology allows the modern human to cover huge distances of travel in a very short period of time. This is the main reason of the prosperity of the travel and vacation industry.

The travel and vacation industry offers their customers a wide variety of destinations and services to make their vacations unforgettable. Millions of people take advantage of these services. However, many more millions of people are still deprived of this opportunity.

There is an old saying: "A person must build a house, give birth to a child and travel the world." Unfortunately the state of the economy in the United States and around the world is such that even a family with an average income who purchased a home, which needs to be maintained and paid for, and has a child or even two or three that need to be supported, this family certainly can not afford not only to travel around the world, but also to pay for a week of vacation, in order for their kids to swim with dolphins, feed exotic fish and to basically have fun. The maximum this family can allow themselves is to get in their car, or take public transportation, and go to the nearest park in order to get away for a weekend.

Today the price of travel and vacation is not affordable to many people. The main cause of the problem is a huge marketing overhead, which increases the retail price of travel and vacation dramatically and makes it unaffordable for millions of people. In other words, the travel and vacation companies are deprived from the huge market of potential consumers of their product.

The first successful attempt to solve the above mentioned problem (marketing overhead) in the hospitality business goes by its roots back to the middle of the 1960's, when in Europe at one of the Alp resorts, the customers were offered future vacations at a price which was considerably less than the regular price. The bet was on the price affordability (no marketing overhead), "word-of-mouth" marketing (free and the most productive marketing in the world) and long-term relationship with customers (guaranteed business in years ahead).

The owner of the resort made a daring decision that laid the groundwork for what has evolved into a multi-billion timeshare industry.

Today over 6.5 million families own their vacations at resorts in more than 90 countries with annual sales reaching over 9 billion.

The quality of timeshare product has improved continually over the years offering consumers condominium-style vacation accommodations in some of the most appealing destinations around the globe.

Timesharing gives consumers flexibility. A variety of flexible-use options is available to vacation owners, including the ability to exchange their accommodations at comparable resorts around the world.

Some of the most prominent names in hospitality have made highly visible moves into timesharing, validating and enhancing the credibility of the concepts. These companies recognized the potential of timesharing as an extension of their existing product line, and have made substantial commitments furthering the industry's global development.

As the demand for timeshare product has grown, so, too, has consumer's desire for flexibility. Options have evolved from the traditional fixed week, fixed unit product to include split week, floating week, vacation clubs, point-based programs, and other alternative uses.

Vacation clubs give buyers access to multiple resorts within a developer's resort group, as well as other ancillary club benefits. Point-based programs frequently offered through a club structure, allow consumers to purchase a specific number of points that can be used in several ways. Points give the consumer the ability to access different unit types and amenities, or even other travel services. Often, consumers can purchase additional points or carry forward unused points toward future vacation experiences, such as vacation exchange.

Vacation exchange is the single most valuable enhancement to the timeshare purchase. It gives timeshare owners the opportunity to trade accommodations at their home resort for comparable accommodations at other resorts around the world.

In transacting an exchange, timeshare owners place their accommodations into the exchange system, making them available to other members who want to vacation at another timeshare resort, or at a different time of the year.

Vacation exchange provides resort developers with a powerful sales tool that delivers the added value of increased flexibility—a proven motivation to the purchase of timeshare vacations.

As a result more and more brand names in the hospitality industry, as well as respected independent developers, are realizing and have become involved in the timeshare business, which has become a global phenomenon.

Since the late 1960's, timesharing has been expanding across the globe. In the beginning of the 1980's, there were about 500 resort projects. Today there are more than 5,700, with the number of timeshare owners increasing to approximately over 6.5 million. Resorts are located in more than 90 countries. The United States has the highest concentration, with more than 1,700 resorts representing about 46 percent of the world market. Europe represents the second largest timeshare market with more than 1,300 resorts, followed by Mexico, the Caribbean, Asia, Australia, New Zealand, and South America.

Today, timesharing is a global success and the fastest-growing segment of the U.S. hospitality industry, with annual sales reaching billions.

Annual sales could reach even much higher numbers if there were none of the problem that the industry faces today, and this problem is returning to a huge overhead related to traditional marketing.

Research indicates that in the United States alone more than 13 million people are interested in purchasing some form of vacation ownership in the next two years. But current industry estimates place market penetration at approximately 3-5 percent of the 13 million potential purchasers, those who are able to afford tens of thousands of dollars of the price of vacation ownership, in which is up to 70% related to coverage of marketing overheads.

Compared to the 1960's and 1970's, when demand for timeshare was high and just under 100 resorts around the world were involved in timeshare programs (so, there was little, if any, competition between them, and, as a result, there was almost no marketing overheads, which made the price of timeshare affordable for average purchasers), today, because the number of timeshare resorts reached the thousands, the competition between them reached its highest point, as well as marketing overhead, which, relatively, made prices of vacation ownership not affordable to many. And those, who can not afford it, did not even qualified for attending sales presentations.

With information, provided by industry trade organization's report, resort developers have fine tuned the process of identifying the people who are most likely to purchase timeshare. It's easy to form a picture of the typical timeshare owner.

In accordance with this report the average timeshare buyers are: middle-aged, well educated and are nearly five times more likely to have graduated from college or to hold a post-graduate degree than the general United States adult population; 87 percent attended college, plus 23 percent hold a master's or doctoral degree, and 44 percent work in professional or managerial positions, while 11 percent are self-employed. This high level of educational attainment and entrepreneurship is a discriminant characteristic that correlates with household income.

The average timeshare owners have a median income of $92,000, while the average household income is over $110,400, compared with just 12 percent of the general U.S. population. About 95% of timeshare owners own their primary residence, reporting on average home value of $263,000.

Huge marketing overhead (which is up to 70% of retail price of timeshare) making price of vacation ownership affordable just by 3%-5% of many of those who want to purchase it.

In other words, timeshare industry is deprived of 95% to 97% in excess of potential business.

The experts estimate that: the average American household owed about $10,000 in credit card debt (at a rate of up to 23%) and credit card debt more than doubled from 1993 to 2003; the source of about 35% of credit card company's profit is late payment fees; more than 1.2 million people filed for bankruptcy in the U.S. in 2003, and the number is increasing every year despite a booming economy; household borrowing stands at a record $6.8 trillion—almost a 50% jump in the past five years; according to a USA Today survey, 54% of American's say it would take three months or less to fall behind in bill payment if they lost their job today.

Due to the above mentioned reasons, about 27% of timeshare owners would like to sell their timeshare ownerships.

However, the timeshare companies refuse to buy their product back.

The existing timeshare auctions are full of offers and absence of demand.

The reason for absence of demand for timeshare is that according to government statistics 67% of average Americans prefers to invest money in real estate, such as primary and/or second home, using second home as an investment property (business property) in order to create wealth-income, equity and appreciation.

In timesharing real estate (business property) as well, as outcoming benefits, belong to developers.

Current business model, which exclude business (vacation) property's ownership opportunity and current business strategy, which include huge overheads related to the traditional marketing—deprives timeshare organizations of access to tens of millions of potential consumers of their product.

In effort to escape huge overheads related to the traditional marketing, many business organization in U.S. and around the world are using network marketing systems. However, up to present day, network marketing is not adopted by travel and vacation industry.

In the late 1940's, a small vitamin company realized that most of their new business was coming from referrals. The owners scrapped the company's traditional marketing plan and replaced it with a radical new marketing program based exclusively on referral fees.

Over the next, almost six decades, network-marketing system exploded. Today there are literally millions of people worldwide partnering with network marketing companies.

Firms that sell products and services using network marketing (network marketing company(ies)) typically recruit independent sales representatives. The independent sales representative then may (but are not required to) recruit others, who then may (but are not required to) recruit still others.

Network marketing is a powerful tool that makes use of the personal contacts that almost any potential independent sales representative has simply by virtue of his/her normal social circles. The larger a person's social circle and the harder the representative is willing to work, the greater his/her potential to build a successful network for the firm.

Network marketing systems are also efficient in that they operate with very little overhead. Each sales representative is an independent operator in contractual relationship with the firm. Sales representatives build networks from circles of existing acquaintances as well as through the Internet, and this, although time intensive, saves the network marketing company the substantial expense of identifying potential consumers of company's product from among populations of strangers.

In an effort to get access to a valuable source of financing of business development projects, network marketing companies often offer to its network the opportunity to open company's retail outlet under a franchise arrangement and to be the owner of the business.

But in most cases independent sales representatives refuse this privilege and option based on:
 a) not that many independent sales representatives possess sales and management skills necessary for business success,
 b) not that many independent sales representatives possess tens and/or hundreds of thousands of dollars necessary for business development, and
 c) those who possess the necessary amount, prefer to invest in real estate or in business, which is producing socially demanded products, instead of investing in a risky traditional point of sale.

As a result, firms are deprived from access to the valuable source of business development financing.

3 Objects and Advantages

Accordingly, besides the objects and advantages of timesharing and network marketing in my above patent, several objects and advantages are:

a) to provide a method, which allows network marketing organization's network to buy organization's business property, which is producing its product(s) and managed/operated by given organization;
b) to provide a method, which allows network marketing organizations to get a priceless access to the valuable source of business development financing;
c) to provide a method, which allows timeshare organizations to escape the huge overheads related to the traditional marketing;
d) to provide a method, by which timeshare organization offering ownership of vacation property;
e) to provide a method which will give to the timeshare organization a priceless access to a huge market of potential consumers of their products;

Other objects and advantages are:

f) to provide a method which allows any person, regardless of their household income, to be qualified for timeshare opportunity;
g) to provide a method by which travel/vacation migration around the world will be increased dramatically;
h) to provide a method, by which a process of jobs creation and local economies will get a huge positive impact.

Further objects and advantages of my invention will become apparent from a consideration of the ensuing description and drawings.

SUMMARY OF THE INVENTION

In one aspect, the present invention provides a business method/system which consist general purpose computer instructions which will perform in one or more ot the steps of the method described herein:

1. forming a travel and vacation club, which is providing for its members:
   (i) Ben-suming education program;
   (ii) Global vacation exchange program;
   (iii) Business support (mentorship) program;
   (iv) Travel support (such as discounted rates of travel/vacation related services and/or goods for member and his/her family and/or friends) program.
2. choosing (based on club member's survey) a "product of demand" to be sold to/through ben-suming organization's network,
3. forming a business organization such as corporation or limited liability company to market the "product of demand,"
4. forming a contractual relationship between the business organization and ben-sumer(s) on an independent contractor basis, where the ben-sumer(s) are compensated, among other business activities, for his/her buys/uses (consuming) of organization's product(s) and for the buys/uses of additional ben-sumer(s) recruited by given ben-sumer for business organization,
5. providing a compensation point system,
6. creating a plurality of levels of compensation and benefits for the ben-sumer(s), wherein compensation increases based, among other things, on the buys/uses of the ben-sumers, recruited by given ben-sumer, directly or indirectly,
7. providing at one or more of above mentioned levels an entitlement for ben-sumers to exercise a privilege and option to buy business organization's business (vacation) property, by using his/her compensation points as a form of payment,
8. using above mentioned payments as a source of financing of business property (resorts) development project(s),
9. negotiating and signing a timeshare agreement between business organization and qualified ben-sumer (prospective property owner). In accordance with given agreement (i) organization selling and (ii) ben-sumer buying business property (condominium), by using compensation systems as a form of payments. Given ben-sumer will be granted a title of the property upon full payment for fifty second vacation week (including all fifty two vacation weeks). A price of one vacation week is equivalent to the $\frac{1}{52}$ of property's price and, relatively, price of the property is equivalent to the price of fifty two vacation weeks,
10. providing a trust company to manage given timeshare agreement, between business organization (grantor) and prospective property owner (beneficiary),
11. allowing person(s), who are not current ben-sumer(s) and/or existing ben-summer(s) who not yet achieved tier of privilege and option to buy business property, make an offer,
12. conditioning the acceptance of the offer (i) upon a refusal by existing qualified ben-sumer(s) and (ii) under organization's business property arrangements,
13. selling, upon prospective property owner's wish, his/her vacation weeks (services) to/through business organizations network and using generated for it his/her profit, as a source of prospective property owner's additional payment for business property (condominium),
14. granting the ownership of business property (title) to the ben-sumer (prospective property owner) in accordance with terms and conditions of trust (timeshare agreement) between business organization (grantor) and ben-sumer (beneficiary), these agreement being managed and title of given property being held by trust company, until it will have fulfilled its purpose, then title will be released by and transferred from trust company to a vacation property owner (titleholder),
15. further negotiating and signing the timeshare agreement between vacation property owner and ben-suming timeshare organization, wherein (i) vacation property owner selling and (ii) timeshare organization buying vacation points for (iii) re-sale to/through organization's network and (iv) within period of time in accordance with given timeshare agreement.

DRAWINGS—REFERENCE NUMERALS

10. ben-suming timeshare organization
12. ben-suming company
14. network of ben-suming company 12 of ben-suming timeshare organization 10.

16. business property of ben-suming timeshare organization 10.
18. trust company
20. travel and vacation club of ben-suming timeshare organization 10.
22, 24, 26. independent ben-sumers
55. prospective property owner (qualified ben-sumer)

DETAILED DESCRIPTION OF THE INVENTION

In order to provide a better understanding of the present invention, the following terms are defined herein, but such definitions shall not limit the ordinary meaning of these terms:

(a) "downline" means the marketing network of independent ben-sumer(s) recruited by a given independent ben-sumer, whether directly (by personal recruiting such independent ben-sumer) or indirectly (by having such independent ben-sumers recruit still another independent ben-sumers, and so on in each iteration).

(b) "ben-suming system" means a network marketing system under which qualified ben-sumer is entitled for privilege and option (i) to buy ben-suming organization's business property, which is (ii) managed and operated by given organization, (iii) producing services and/or goods to be sold to/through its network and, (iv) by using his/her compensation points as a form of payment for given business property.

(c) "ben-sumer" means an independent sales representative who benefits (receiving compensation) for (among other business activities) his/her and his/her downline's consuming (buys/uses) of ben-suming organization's services and/or goods.

(d) "compensation point" means a unit of measurement of ben-sumer's productivity and, which is equivalent to a pre-determined amount of money. More volume, more points, more money.

(e) "vacation point" means a unit of vacation credit, which gives to a buyer of vacation ownership (services produced by seller's vacation property) the ability to buy now and pay later. Also "vacation point" means a unit of vacation ownership which is equivalent to pre-determined vacation time and sum in accordance with terms and conditions of timeshare agreement.

(f) "independent sales representative" means a person who sells the products of network marketing company in a network marketing system in return for compensation. An independent sales representative may, but need not, recruit other persons to be independent sales representative(s) in the same network. Independent sales representatives are typically independent contractors under state laws.

(g) "network marketing company" means a person who sells services and/or goods through a network. A network marketing company is a part of every independent sales representative's upline and every independent sales representative is part of network marketing company's downline.

(h) "network" and "network marketing system" means a system under which a network marketing company and independent sales representative(s) enter into, and perform under, one or more independent contractor agreements under which independent sales representatives may sell service and/or goods for the network marketing company to customers and receive compensation for the network marketing company or another person in the independent sales representative's upline; and the independent sales representatives may recruit other persons to be independent sales representatives and be compensated based on the sales of services and/or goods by other independent sales representatives in the independent sales representative's downline.

(i) "person" means an individual, corporation, partnership, limited partnership, limited liability company, association, joint-stock company, trust, an unincorporated organization or other organization.

(j) "organization" means a group of persons working together for a common business purpose.

(k) "trust company" means the person which holding title and/or other legal proof of ownership, until trust will have fulfilled its purpose.

(l) "title" means legal proof, such as document, of ownership of property.

(m) "business property" means any form of person's possession, which producing services and/or goods to be sold for person's profit and/or benefit.

(n) "vacation property" means vacation home, which producing vacation services, such as accommodation and recreation, for rest and relaxation, at time period away from one's primary home, one's work and/or one's regular activities.

(o) "business development projects" means development of business property.

(p) "club" means a group of persons, who join together because of common purposes, interests and benefits.

(q) "member" means a person who belongs to an organization and/or club.

(r) "membership" means the state of being a member of the organization and/or club under its terms and conditions and payment of annual fee.

(s) "product of demand" means travel and/or vacation related service(s) and/or good(s) which could be used by ordinary person on daily and/or regular basis.

(t) "timeshare" means joint vacation ownership that gives each owner the right to use vacation home a certain time per calendar year.

(u) "upline" means the network of independent ben-sumers through which a given independent ben-sumer was recruited.

Figure 1:
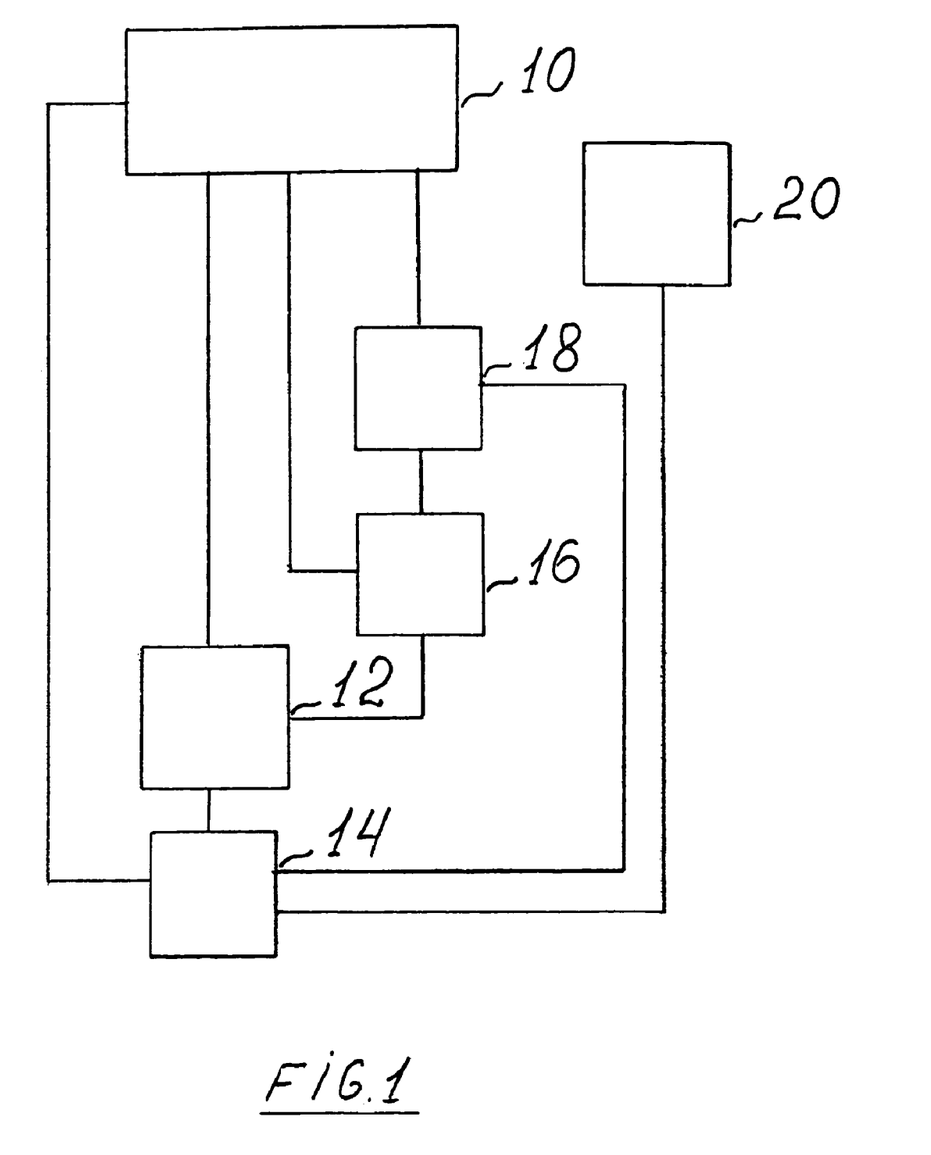
FIG. 1 is a diagram that illustrates ben-suming timeshare organization.

Referring now to FIG. 1 of the drawings ben-suming timeshare organization 10 is shown. These organization comprises: ben-suming company 12; network of independent ben-sumers 14; business property 16; trust company 18; club 20.

Figure 2:
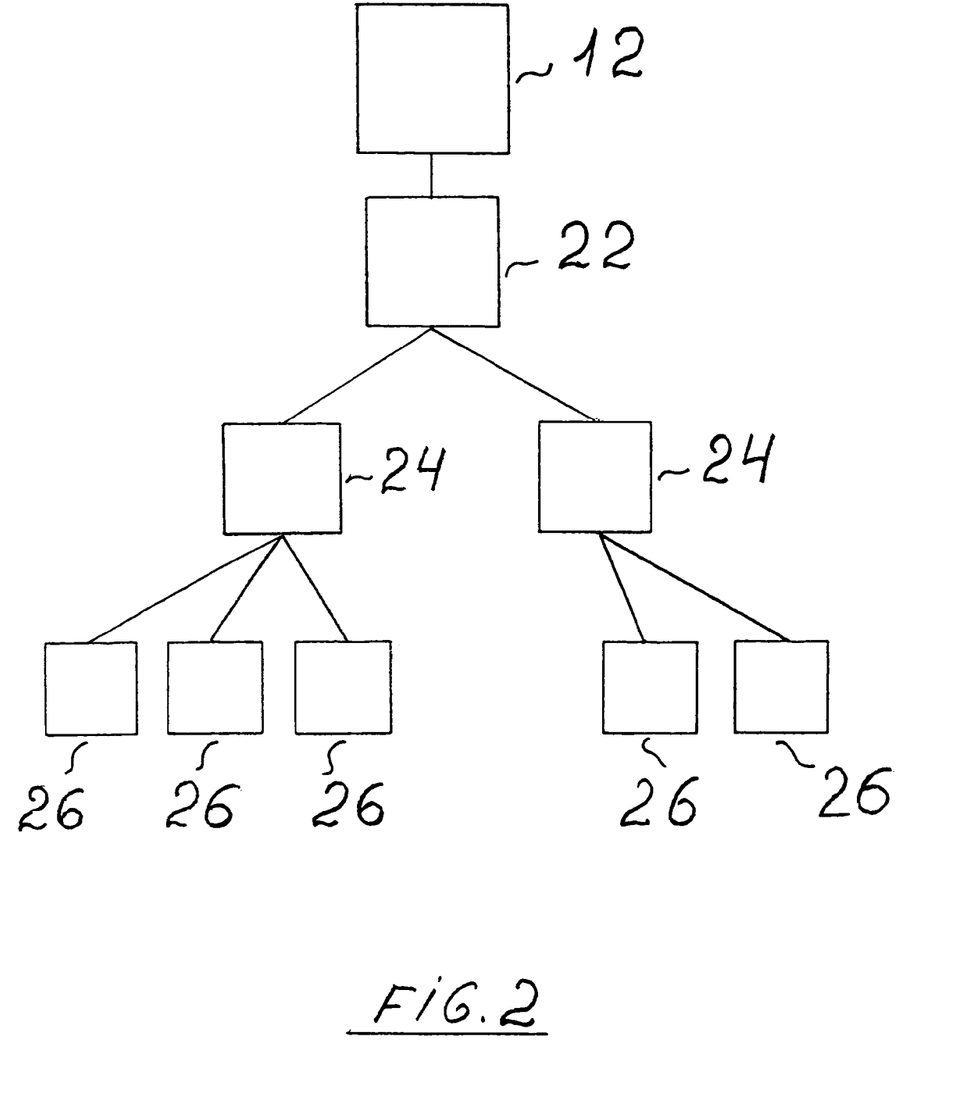
FIG. 2 is a diagram that illustrates a multi-level ben-suming hierarchy.

Referring to FIG. 2 of the drawings ben-suming company 12 is shown. Although ben-suming company 12 can be an unincorporated individual, it is preferably a juristic entity such as a corporation or limited liability company. Ben-suming company 12 enters into a contractual relationship on an independent contractor (non-employee) basis with independent ben-sumer 22. This contractual relationship includes provisions providing for payment by the ben-suming company of compensation to independent ben-sumer 22 for each buy/use and/or sale of services or goods by ben-sumer 22. The contractual relationship between company 12 and ben-sumer 22 further provides that ben-sumer 22 will be compensated based on buys/uses and sales by additional recruited ben-sumers 24 and their downline counterparts 26.

Figure 3:
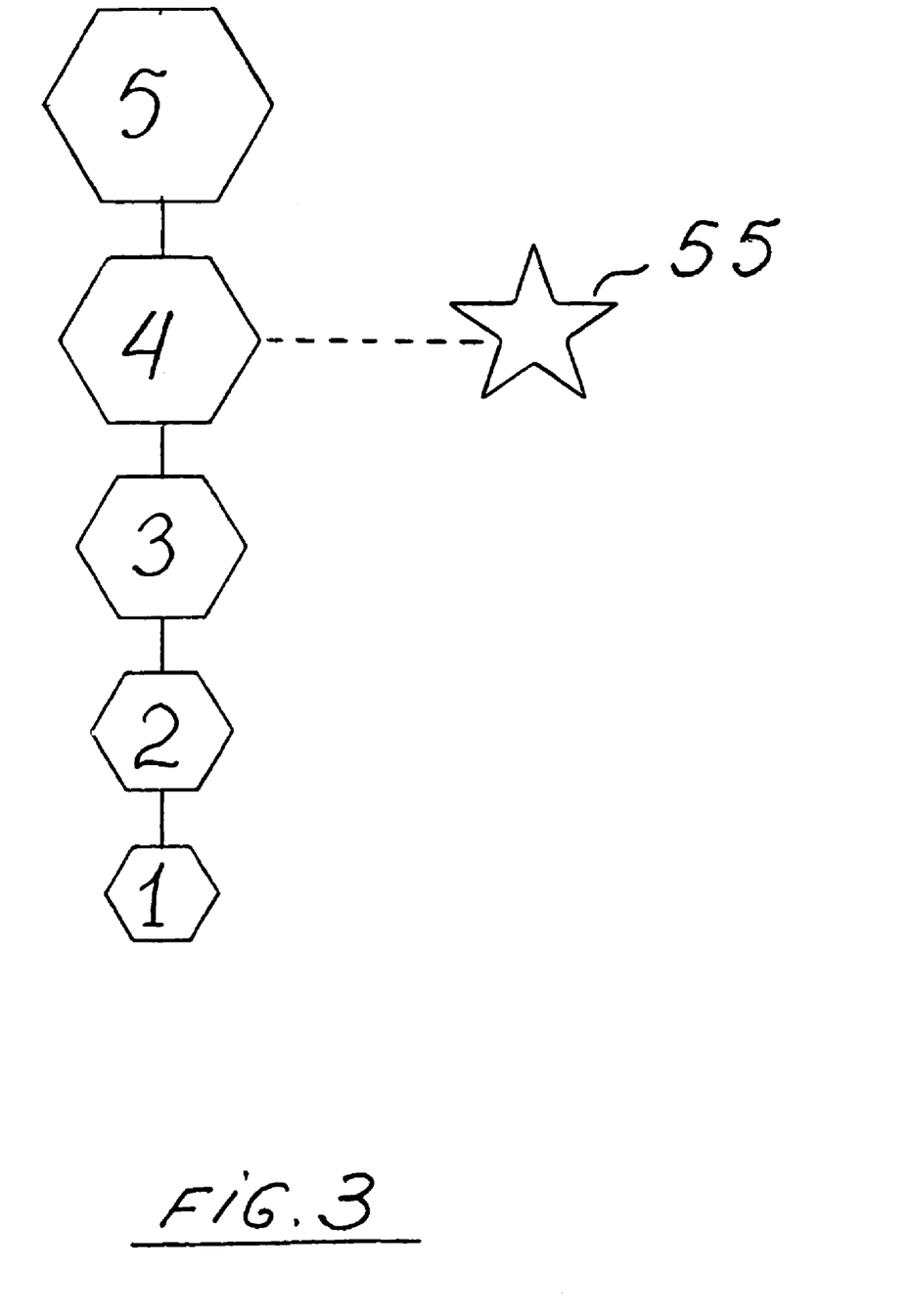
FIG. 3 is a diagram that illustrates multiple levels of compensation, privileges and/or benefits

The contractual relationship between independent ben-Sumer 22 and ben-suming company 12 further provides that based on reaching a preselected quota of business activities and/or predefined aspects of network downline, independent ben-sumer 22 moves upward in ben-suming timeshare organization 10. As shown in FIG. 3 of the drawings, each level (tiers 1-5) provides greater compensation and benefits to ben-sumer 22. In this embodiment, at tier 4, ben-sumer 22 is eligible for privilege and option to buy business property 16, most preferably a vacation property (condominium). Referring still to FIG. 3, qualified ben-sumer (prospective property owner) 55 is shown.

Figure 4:
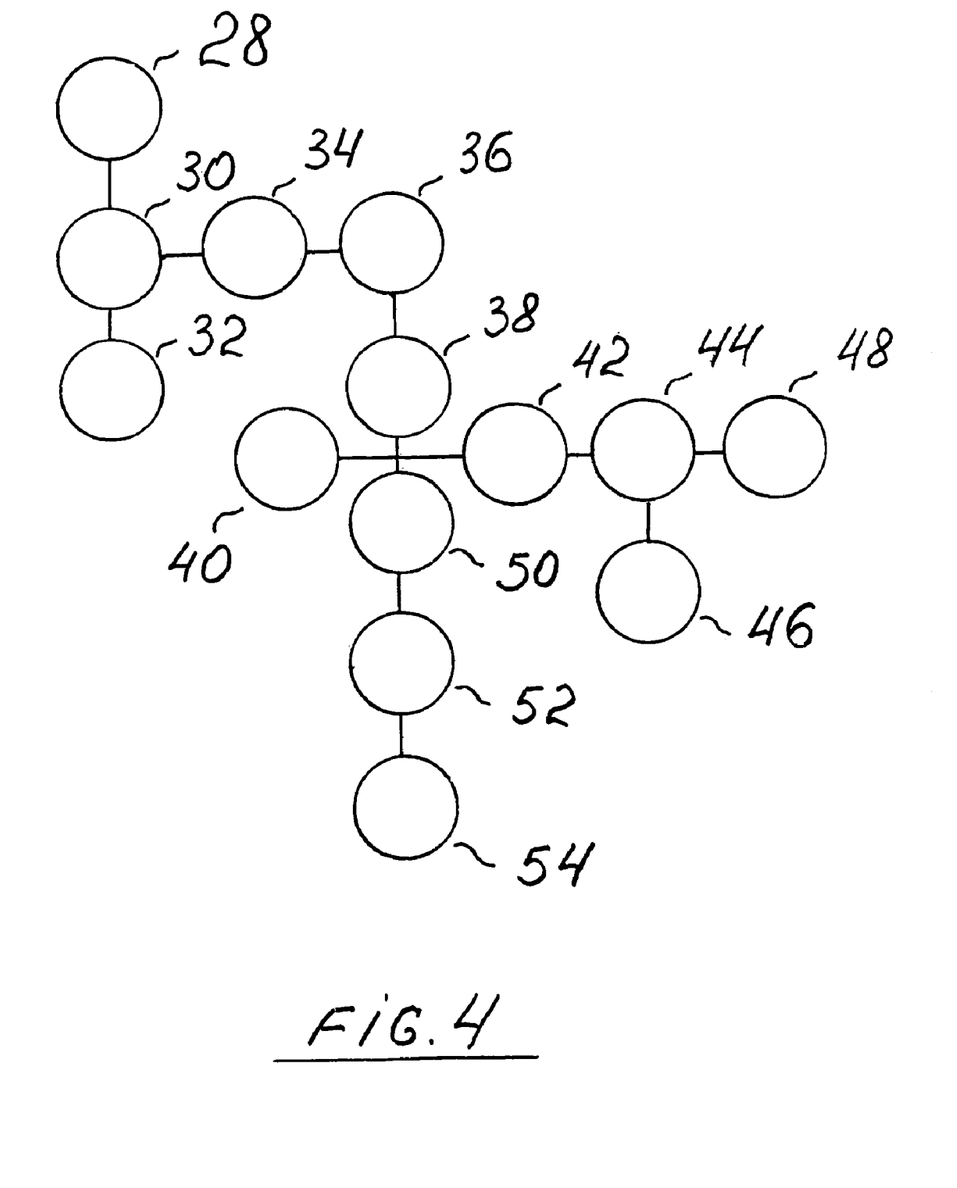
FIG. 4 is a flowchart of the method of the present invention.

Referring now to FIG. 4 of the drawings, the innovative Business Method of the present invention will be described.

In step 28 development project(s) of ben-suming timeshare organization's 10 business property 16 (condominium-style resort(s)) is provided.

In step 30, qualified ben-sumer 55 is offered privilege and option to buy business property 16 (condominium-style unit), by using his/her compensation points as a form of payment. The prospective property owner 55 is current independent ben-sumer and member of club 20 of organization 10, who reached level (tier) 4 of compensation and benefits. In the event that these persons are not wishing to buy business property, then in step 32 he/she will deny this privilege.

In the event that ben-sumer 55 wishes to exercise privilege and option to buy business property, than in step 34 a timeshare agreement is negotiated. This agreement includes, but not limited to such terms and conditions as:

1) Organization 10 selling and Ben-sumer 55 buying business property 16 (condominium), by using his/her compensation points as a form of payment for given property.
2) Ben-sumer 55 will be granted title of business property 16 (condominium) upon full payment for fifty-two (52) vacation weeks.
3) The price of one vacation week is equivalent to the 1/52 of property 16 price. Relatively price of property 16 (condominium) is equivalent to the price of fifty-two vacation weeks.
4) Upon ben-sumer's 55 downpayment (as minimum as price of one vacation week), organization 10 and ben-sumer 55 entering into a timeshare relationship, and (i) organization 10 (grantor) transfers (ii) title of property 16 (condominium-style unit) to (iii) the trust company 18 to hold for the benefit of (iv) ben-sumer 55 (beneficiary) in accordance with the purpose of the trust. Upon fulfillment of the trust, trust company 18 will (v) release and transfer title of the property 16 to the ben-sumer 55 (owner).
5) Upon ben-sumer's 55 payment number of his/her vacation weeks is in increase and, inverse proportionally, number of organization's 10 weeks is in decrease. This process controlled by trust company 18.
6) Ben-sumer 55 has privilege and option to transfer his/her vacation weeks to organization 10 for sale of vacation service, produced by property 16 within his/her vacation weeks, to/through network 14.
7) organization 10 has obligation to accept given vacation weeks and ben-sumer's 55 profit will be used as a source of his/her additional payment for property 16.
8) Upon full payment and fulfilment of the trust, ben-sumer 55 becoming an owner (title-holder) of property 16.
9) Then ben-sumer (owner) 55 and organization 10 have a privilege and obligation to enter into a new form of timeshare relationship, under which ben-sumer (owner) 55 selling and organization 10 buying vacation points for re-sale to/through network 14.
10) In event that ben-sumer (owner) 55 wants to sell his/her property 16, organization 10 has the privilege and obligation to buy it out at anytime and/or reason, upon owner's wish.

In step 36 ben-sumer 55 investing pre-determined amount of compensation points (as downpayment) and organization 10 (grantor) transfers title of the property 16 to the trust company 18 for benefit of ben-sumer 55 (beneficiary).

Upon ben-sumer's 55 payment for the property 16 number of his/her vacation weeks is in increase and, inverse proportionally, number of organization's 10 vacation weeks is in decrease. In step 38 this change in ownership status will be reflected in timeshare agreement (trust) by trust company 18.

In event that ben-sumer 55 changes his/her mind and does not want to buy property 16, then in step 40 organization 10 refunding his/her investment and timeshare agreement between them are terminated.

In event that property 16 upon ben-sumer's 55 refusal becomes vacant, a person (who is not a current ben-sumer of organization 10, but wishes to become one for consuming and/or sale of organization's 10 products and for recruiting additional downstream of independent ben-sumers for company 12, by buying organization's 10 property 16) have right to make an offer in step 42.

Alternatively, a prospective owner of vacant property 16 could be an existing ben-sumer, who has not yet reached the organization's 10 business property option tier.

In step 44 above mentioned person(s) is evaluated by organization 10 to determine whether it possess the qualifications necessary for becoming an owner of property 16. This qualifications preferably include the ability to purchase property 16 by paying downpayment in form of traditional payment and in sum, which is even to sum paid off to ben-sumer 55. Also other qualifications could be imposed.

In the event that these person(s) do not possess the necessary qualifications, then the process ends at step 46, and the application by that person is denied.

In the event that said person(s) is qualified, then in step 48, he/she becoming prospective property owner by repeating the steps 34 and 36.

In step 50 ben-sumer 55 transfers his/her vacation weeks to the organization 10, to be sold to/through its network 14, and ben-sumer's 55 profit will be used as an additional payment for property 16.

In step 52 ben-sumer 55 bought all fifty-two vacation weeks out. As a result trust company 18 released and transferred title of the property 16 to the ben-sumer 55 (owner).

In step 54 ben-suming timeshare organization 10 and (vacation property owner) ben-sumer 55 negotiating and entering into a new form of timeshare relationship, wherein (i) ben-sumer (owner) 55 selling and (ii) ben-suming timeshare organization 10 buying some amount of vacation points for re-sale to/through its company's 12 network 14.

Advantages

From the description above, a number of advantages of my business method become evident:

For Ben-Sumer (Benefitting Consumer):
1. It provides an opportunity of money-making ben-suming of travel/vacation services and/or goods instead of traditional money-losing consuming of travel/vacation services and/or goods.
2. It provides an opportunity of vacation (business) property ownership, with all outcoming benefits, instead of traditional ownership of vacation time.
3. It provides an opportunity to become the vacation (business) property owner regardless of amount of household income and possession of major credit cards.
4. Sale of services produced by his/her vacation (business) property provides a valuable source of extra income.

For Ben-Suming Timeshare Organization:

5. It provides a valuable opportunity to escape huge overheads related to the traditional marketing.
6. It provides a priceless access to a huge market of potential consumers of organization's products.
7. It provides a creation of life-long relationship between organization and consumers of its product.
8. It provides a priceless access to a valuable source of financing of business development project(s).
9. It will dramatically increase not only organization's business success, but also travel/vacation migration around the world, which is For Local Communities and Economies:

10. Provides jobs creation and positive economic impact. Not only are jobs created at the timeshare resorts (during development and after occupancy) but local businesses also need to hire additional staff to handle increased number of visitors.

CONCLUSION, RAMIFICATION, AND SCOPE

Accordingly, the reader will see that the business method and system of my invention, which comprises the opportunity of buying network marketing organization's business property, by using compensation system as a form of payment for given property is fundamental for business success, and bensuming timeshare organization(s) needs provide all schemes in order to promote this.

while my above descriptions contain many specificities, these should not be construed as limitations on the scope of the invention, but rather as an exemplification of one preferred embodiment thereof. Many other variations are possible:
a) business property (condominium) could be not only in form of traditional dwelling, but also ship's stateroom, or train's sleeping car;
b) business property (vacation home) could be in form of single family house, townhouse, bungalow;
c) business property could produce plurality of different services and/or goods, relatively;
d) form and nature of legal agreement between business organization and prospective property owner (qualified ben-sumer) could be different;
e) form of legal proof of business property's ownership could be different;
f) form of payment for business property could be different.

Accordingly, the scope of the invention should be determined not by the embodiment(s) illustrated, but by the appended claims and their legal equivalents.

I claim:

1. A method of creating and operating an innovative ben-suming business organization comprising the steps of:
   (a) providing a computer system and a program or programs designed to track, control and analyze information regarding said method,
   (b) creating an online ben-suming vacation travel club, which is providing for it's members:
      (i) registration and development of an online network of prospective ben-sumers
      (ii) online ben-suming education
      (iii) online survey among said club members to determine prospective product(s)-of-demand to be produced and/or used by a prospective members of a prospective ben-suming business organization,
   said steps include, but not limited to, usage of said computer system and said program or programs,
   (c) creating a multi-level ben-suming company with said online network of independent ben-sumers,
      said step includes, but not limited to, usage of said computer system and said program or programs,
   (d) creating a point-based tiered compensation system for payments and benefits of said independent ben-sumers,
      said step includes, but not limited to, usage of said computer system and said program or programs,
   (e) developing a ben-suming vacation real estate, by using said ben-suming compensation system as the-one-and-only source of financing of a development project(s),
      said step includes, but not limited to, usage of said computer system and said program or programs,
   (f) providing at one or more of said tiers an entitlement for said independent ben-sumer(s) to exercise a privilege and option
      (i) to buy a ben-suming vacation-real-estate-unit of said ben-suming business organization, which is producing services to be sold to/through said organization's network,
      (ii) by using said compensation system as the-one-and-only form of payment for said real estate unit,
      said entitlement is determined by using said computer system and said program or programs,
   (g) offering to said entitled independent ben-sumer(s) said privilege and option
      (i) to buy said ben-suming vacation-real-estate-unit,
      (ii) by using said ben-suming compensation system as the-one-and-only form of payment for said real estate unit,
      said step includes, but not limited to, usage of said computer system and said program or programs,
   (h) negotiating and signing a ben-suming timeshare trust agreement between said ben-suming organization which, in accordance to said trust, is a grantor and/or legal owner of said real estate unit, and said entitled ben-sumer who, in accordance to said trust, is a beneficiary and/or equitable owner of said real estate unit, wherein
      (i) said ben-suming organization are selling said ben-suming vacation-real-estate-unit, by selling ownership of a fifty-two (52) ben-suming-vacation-weeks, which are units-of-equitable-ownership of said vacation-real-estate-unit
      (ii) said entitled ben-sumer(s) are buying said ben-suming vacation-real-estate, by buying ownership of said fifty-two (52) ben-suming-vacation-weeks,
      (iii) by using said ben-suming compensation system as the-one-and-only form of payment for said units-of-equitable-ownership, and as a result
      (iv) said ben-sumer becoming a full legal owner of said ben-suming timeshare vacation real estate upon full payment for all of said fifty-two (52) ben-suming-vacation-weeks,
      (v) wherein a price of one of said fifty-two units of ownership is equivalent to a fraction $1/52$ and/or 1.92% of said ben-suming vacation real estate unit's fixed selling price,
      said step includes, but not limited to, usage of said computer system and said program or programs,
   (i) creating a trust company to manage said trust agreement,
      said step includes, but not limited to, usage of said computer system and said program or programs,
   (j) granting, upon fulfillment of said trust agreement, a title-of-legal-ownership of said ben-suming timeshare vacation-real-estate-unit to said beneficiary and, as a result, said beneficiary becoming a legal owner of this real-estate-unit,
   said step includes, but not limited to, usage of said computer system and said program or programs,
(k) negotiating and signing a new form of ben-suming timeshare business agreement between said new owner of said ben-suming vacation-real-estate-unit and said ben-suming organization wherein, among other things:
  1. said ben-suming business organization has a privilege and legally required:
     (i) to buy-out said owner's vacation-real-estate-unit
     (ii) at any time and/or reason upon said owner's wish,
  2. said new owner has a privilege and legally required:
     (iii) to sell to said organization
     (iv) said services produced by said his/her ben-suming vacation-real-estate-unit
     (v) within a period of time in compliance with said ben-suming timeshare business agreement
  3. said ben-suming timeshare business organization has a privilege and legally required:
     (vi) to buy said services produced by said ben-suming vacation-real-estate-unit
     (vii) within said period of time in compliance with said ben-suming timeshare business agreement and then
     (viii) to sell to/through said online network of ben-suming said services produced by said ben-suming vacation-real-estate-unit within said period of time in compliance with said ben-suming timeshare business agreement,
     (ix) by using said ben-suming compensation system as the-one-and-only form of payment for said services,
   Said step includes, but not limited to, usage of said computer system and said program or programs,
       whereby said ben-suming timeshare organization will get a priceless access to a huge market of potential consumers of their product(s), whereby ben-suming resorts development and vacation/travel migration will be increased dramatically, and whereby process of jobs creation and local economies will get a huge positive impact.

* * * * *